United States Patent [19]

Cunniff

[11] Patent Number: 5,239,177

[45] Date of Patent: Aug. 24, 1993

[54] ANGULAR POSITION AND ROTATIONAL VELOCITY DETECTION USING "PERFECT WORDS"

[75] Inventor: John F. Cunniff, Westport, Conn.

[73] Assignee: Hughes Aircraft Company, Los Angeles, Calif.

[21] Appl. No.: 804,870

[22] Filed: Dec. 6, 1991

[51] Int. Cl.$^5$ .............................................. G01D 5/34
[52] U.S. Cl. ................................. 250/231.18; 341/13
[58] Field of Search .................. 250/231.18, 231.16, 250/231.17, 237 G, 231.15; 356/375, 372; 341/13

[56] References Cited

U.S. PATENT DOCUMENTS

| | | | |
|---|---|---|---|
| 3,081,379 | 3/1963 | Lemelson | 356/372 |
| 4,047,025 | 9/1977 | Lemelson | 250/237 G |
| 4,439,672 | 3/1984 | Salaman | 250/237 G |

Primary Examiner—David C. Nelms
Assistant Examiner—Que T. Le
Attorney, Agent, or Firm—Michael W. Sales; Wanda K. Denson-Low

[57] ABSTRACT

A precision temporal pulse 10 indicating accurate rotational velocity and precise angular position of a object rotating about an axis is generated. A "perfect word" 12 binary code sequence is applied to a binary code track 16 of an encoding disk 13. Binary code bits are synchronously detected as they pass through a code reader 22, that synchronously generates a bit by bit replica of the sequence of bits detected by the reader 22. The bits are stored in a shift register 28, and are synchronously compared to a stored reference value by logic circuitry. A temporal pulse is generated when the logic circuitry has identified that the stored value is equal to the reference value.

9 Claims, 1 Drawing Sheet

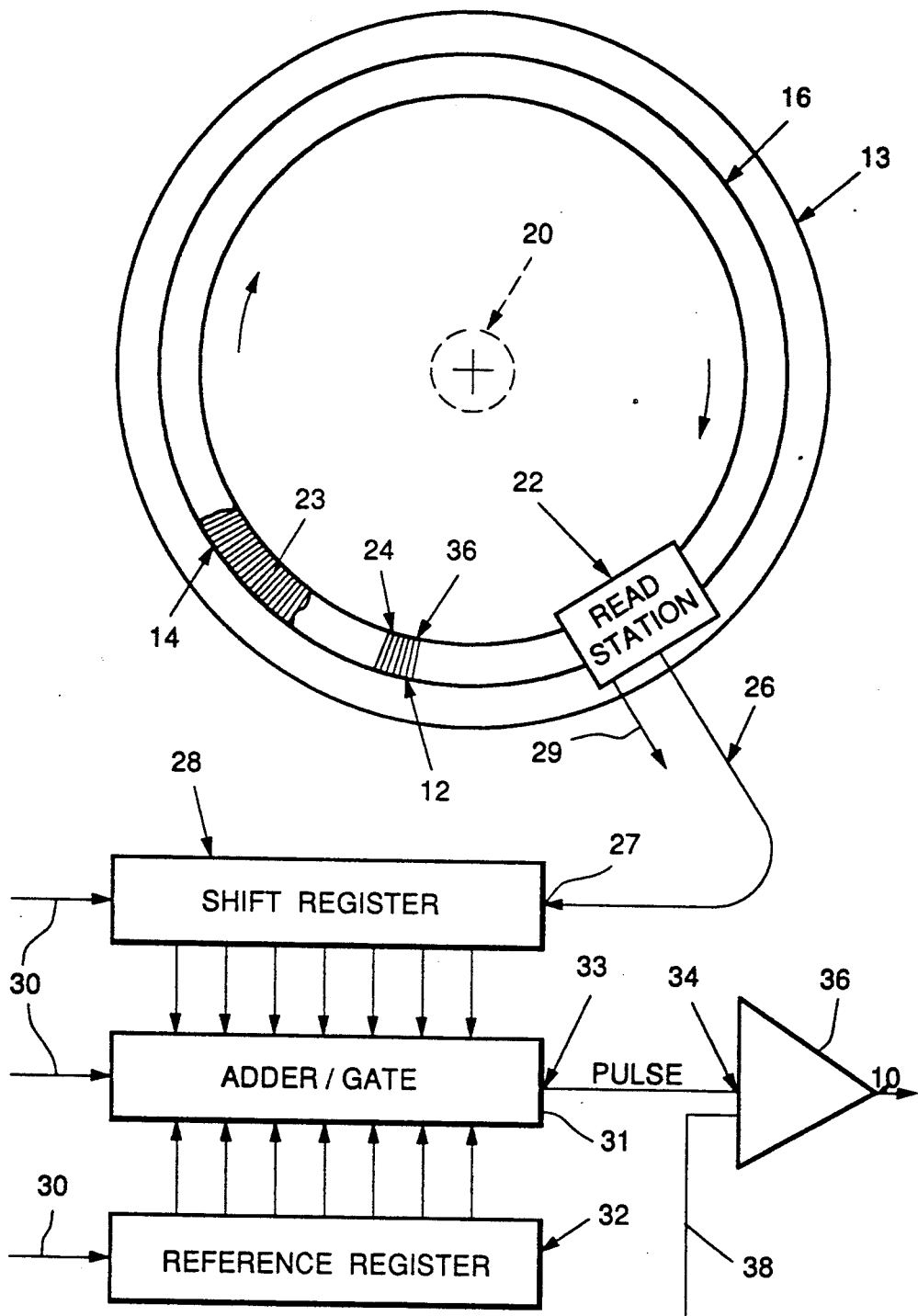

_5,239,177_

ANGULAR POSITION AND ROTATIONAL VELOCITY DETECTION USING "PERFECT WORDS"

FIELD OF THE INVENTION

The present invention relates to position encoding and more particularly to the application of a specific class of binary code to a rotating code disk to generate a precise temporal pulse once per each repetition of the code sequence on the disk.

DESCRIPTION OF THE PRIOR ART

There are many instances where a temporal or timing pulse generated by a marking on a rotating shaft is used to determine that the shaft is at a particular position, to indicate that the shaft is rotating with a particular rotational velocity or that the shaft is accelerating with a particular rotational acceleration. There are situations where great precision of temporal pulse generation is required for critical control functions of a machine.

An example of a situation that requires precise generation of temporal pulses may be found in space-borne imaging spectrometers in which a scanning fold mirror is rotated in front of a photon collecting optical system. The generation of precision temporal pulses is required to indicate exact commencement of a scan sequence. It is also useful for accurate indication of the rotational velocity of the scanning mirror assembly where constant rotational velocity is controlled.

Heretofore, such temporal pulse generation systems have used single element pick-off techniques to generate temporal pulses. Such prior art devices required relatively low detection thresholds for determining the presence or absence of the single element, often resulting in relatively high missed detections and false pulse generation rates. No prior art device is known that has applied a "perfect word" binary code sequence to a rotating code disk to generate temporal pulses.

"Perfect word" binary codes are binary sequences whose autocorrelation function has very low sidelobes. Examples of "Perfect word" binary encoding are found in R. H. Barker, "Group Synchronizing of Binary Digital Systems", _Communication Theory_, (Willis Jackson, ed. (London: Academic Press, 1958, 273-278).

SUMMARY OF THE INVENTION

The present invention contemplates a temporal pulse generation apparatus and method which provides a means for accurate position identification and precise rotational velocity measurement of a rotating shaft. The invention achieves these desired results by applying a binary code sequence to a rotating code disk and periodically detecting said binary code sequence. More particularly, the binary code sequence applied and detected is a "perfect word" sequence which has an autocorrelation function with low sidelobes. The precise temporal pulse of the present invention is generated each time the last bit of the "perfect word" sequence passes through a code reading station. As the code reading station reads off bits passing through it, it synchronously transfers the bit value to a storage shift register. Thus, as bit sequences pass through the reading station, a replica of the sequence is synchronously passed through the storage shift register. The value of the bits stored in the shift register are synchronously compared to a predetermined "perfect word" bit value stored in a "perfect word" reference bit register. The value comparison of both registers is performed using simple logic circuitry. When the values (code sequence) match, the temporal pulse is generated.

One objective of the present invention is to provide a precise temporal pulse generation apparatus and method.

Another objective of the present invention is to provide a precision temporal pulse generation method and apparatus that is relatively easy to implement using readily available hardware.

Another objective of the present invention is to provide a precision temporal pulse generation method and apparatus for maintaining accurate timing and enhanced angular resolution of a rotating shaft.

Another objective of the present invention is to provide a precision temporal pulse generation method and apparatus that is easily inserted within the binary code tract of an incremental encoder that may already be in use.

Another objective of the present invention is to provide a precision temporal pulse generation method and apparatus that reduces false pulse generation rates.

Other objects and advantages will become apparent to those skilled in the art from the following detailed description read in conjunction with the attached drawings and the claims appended hereto.

DESCRIPTION OF THE DRAWINGS

The Figure is a top view illustrating the binary code sensing and binary code detection apparatus used to generate a precision temporal pulse from a "perfect word" binary code sequence applied to a rotating disk.

DETAILED DESCRIPTION OF THE PRESENT INVENTION

The Figure shows how the present invention may be utilized to generate a precision temporal pulse at system output 10 when a "perfect word" binary code sequence 12 is applied as a reference mark to an incremental encoder disk 13. The "perfect word" code sequence 12 is applied to an incremental binary code 14 on a code track 16 of the incremental encoder disk 13 mounted on a rotational shaft 20.

The "perfect word" binary code sequence 12 comprises a binary word built from an odd number of individual characters or bits. Common "perfect word" sequences have 5, 7, 11 or 13 bits. "Perfect words" exhibit autocorrelation functions with low sidelobes. A discussion of properties of "perfect words" can be found in R. H. Barker, "Group Synchronizing of Binary Digital Systems", _Communication Theory_, (Willis Jackson, ed. (London: Academic Press, 1958, 273-278). It is the properties of the autocorrelation function with low sidelobes that makes these words more desirable to mark positions on the disk 13 than single element designs or other codes.

The "perfect word" 12 can be inserted within the incremental binary code 14 or can be used in connection with a separate code track. In the preferred embodiment, the "perfect word" 12 is inserted into the preexisting incremental code track 16 of the incremental encoder disk 13 to provide the information used to generate the precise temporal pulse at the output 10.

In the embodiment shown in the Figure, all of the bits of the incremental binary code track 16 are read sequentially by a bit reading station 22. The read station 22 is a device that can distinguish between two different binary states. The means used by the read station 22 to read the two different states may be optical, magnetic or mechanical depending on the means used to mark the bits. For example, if optics are used, a device that can detect and distinguish two levels of reflectivity representing the two binary states can be employed as the read station 22.

Upon detection of a bit 23 of the incremental binary code 16 or a bit 24 of the "perfect word" 12, a replica of the detected bit, is generated by the read station 22 and is transmitted along a conductor 26 to a serial input 27 of a shift register 28 having a bit storage capacity or word length equal to the length or number of bits 24 used in the "perfect word" 12. FIG. 1 shows a shift register with a word length equal to 7 bits which corresponds to a 7 bit "perfect word" 12 on the binary code track 16 of the encoder disk 13.

The shifting of the bits in the shift register 28 is controlled by clock pulses. These pulses are outputted from an output 29 on the read station 22 to clock inputs 30 of the shift register 28, an adder/gate 31 and a reference "perfect word" register 32. The timing pulse is derived directly from the incremental binary code track 16 or can be generated by an oscillator phase locked to the incremental track. Because the clock pulses are derived from the code track 16, the shifting of the data bit shift register 28 is synchronous with the rotation of the encoder disk 13. Transition in level from 'zero' to 'one' or from 'one' to 'zero', shifts the data in the register. Each clock pulse loads a newly generated bit into the first position or lowest address of the register 28 and causes a one bit upward shift of the contents in the data shift register 28. The sequential detection of incremental encoding data bits 23 or "perfect word" bits 24, and the generation and transmission of corresponding bits causes the stored contents of the shift register 28 to shift sequentially to higher addresses. Thus, as a sequence of bits pass through the read station 22, a replica of the detected sequence is nearly simultaneously passed through the shift register 28.

After each synchronous shift of the data shift register 28, the entire contents of the shift register 28 are compared to the contents of a reference "perfect word" register 30 by an adder/gate 32. Comparison is continuous. The adder/gate 32 may comprise a plurality of logic gates, the plurality corresponding to the number of bits used in the "perfect word" 12, to compare each bit address of the data shift register 28 to a corresponding bit address in the "perfect word" reference register 30. An input 34 of a system decision comparator 36 is connected to the outputs of the plurality of logic gates and provides a pulse at the system output 10 when a system threshold reference at an input 38 of the system decision comparator 36 is exceeded.

System threshold references for system decision comparators 36 in general must be tuned to achieve optimal performance. If the reference threshold is tuned too high, the system comparator 36 will fail to output some pulses as perfect word bits pass through the register 28. On the other hand, if the reference threshold is tuned too low, then the system comparator 36 may falsely output a pulse. The optimal setting for any system decision comparator 36 reference threshold is determined by a value judgment where the goal is to strike a balance between correct pulse outputting upon passing of "perfect word" bits 24 and tolerable false pulse generation rates.

Employing the use of a "perfect word" 12 to denote a reference mark on a rotating disk 13 allows the system decision comparator 36 reference threshold at the reference input 38 to be set higher than it would be if only a single element or bit were used to denote the reference mark. The "perfect word" 12 permits the use of higher thresholds because the "perfect word" 12 has a higher amplitude than the single bit due to the presence of a greater number of bits to denote the reference mark and outputs that higher amplitude only when the "perfect word" has been correctly identified and replicated in the data register. Thus, the use of the "perfect word" 12 permits the use of a reference mark with longer duration and therefore greater energy and information content.

In the present invention, the reference threshold of the system decision comparator 36 may be increased by approximately one-half the level at which the reference threshold would be set for common, single element encoding read stations multiplied by the number of bits in the "perfect word" binary code sequence 12. For example, the reference threshold for generating a pulse at the output 10 for a seven bit "perfect word" correlation can be adjusted to approximately 3.5 times the threshold for the correlation of a single bit. Thus, threshold set points for systems employing "perfect word" sequences can be increased from 2.5 to 6.5 times the range used for single bit encoded disks depending on the size of the "perfect word" utilized. Setting the reference threshold higher at the input 38 when using "perfect words" 12 results in radically lower false detection rates.

When incremental code data bits 23 are shifted through the data register 28 (during most of the rotation of the disk 13), the correlation of the bits in the register 28 is low, i.e. at the low side lobe level of the auto correlation function. Also, as the "perfect word" 12 reaches the read station 22 and the "perfect word" 12 begins to shift into the data register 28, correlation remains low until the time when the "perfect word" 12 exactly fills the data register 28. At that time, all seven bits in the data register 28 correspond with the seven bits in the "perfect word" 12 reference register 30 and a current or voltage proportional to seven bit correlation is input to the input 34 of the system decision comparator 36. Because the voltage or current proportional to a seven bit correlation exceeds the reference voltage or current supplied at the reference threshold input 38, the system decision comparator 36 outputs a pulse at the output 10.

Thus, the present invention provides a method and apparatus for generating a precision temporal pulse that is extremely easy to implement. The method and apparatus allows for generation of precision temporal pulses on rotating binary encoded disks associated with rotating shafts.

The invention has been described for use in the indication of rotational velocity and position of a rotating shaft; however, it is possible to practice the invention on other rotating objects or other applications in which pulse generation or production is required.

What is claimed is:

1. A temporal pulse generating apparatus for generating a temporal pulse upon each occurrence of a predetermined physical position of an object, said apparatus comprising:

a code track having marked thereon a predetermined binary code sequence;

means for scanning said binary code sequence as the object continually moves past a preselected position;

means, disposed at said preselected position, for detecting each occurrence of said predetermined binary code sequence and for providing an output in response thereto, said detecting means including means for reading the binary code marks from said code track and for generating a binary coded signal corresponding to the read code marks, means for storing sequential bits of said generated binary code sequence, storage means for storing said predetermined binary code sequence and means for comparing the contents of said storage means with the contents of said reference storage means and for providing said output when a positive comparison is detected; and means, responsive to said detecting means output, for generating the temporal pulse.

2. The apparatus of claim 1, wherein the predetermined binary code sequence is a perfect word.

3. The apparatus of claim 2, wherein said perfect word has a word length selected from a group of word lengths consisting of 5, 7, 11, and 13 bits.

4. The apparatus of claim 1 wherein said storage means for said sequentially generated bits is a bit shift register and said storage means for predetermined binary code is a bit register.

5. The apparatus of claim 4 wherein each bit address of said bit shift register means has a corresponding bit address in said bit register.

6. The apparatus of claim 1 wherein said comparison means comprises a plurality of logic gates interconnected between each corresponding bit address of said bit shift register and said bit register.

7. The apparatus of claim 6 wherein all outputs of said plurality of logic gates are connected commonly.

8. The apparatus of claim 7 wherein said outputs are connected to an input of said responsive output means.

9. The apparatus of claim 8 wherein said responsive output means comprises a voltage comparator circuit.

* * * * *